2,878,283

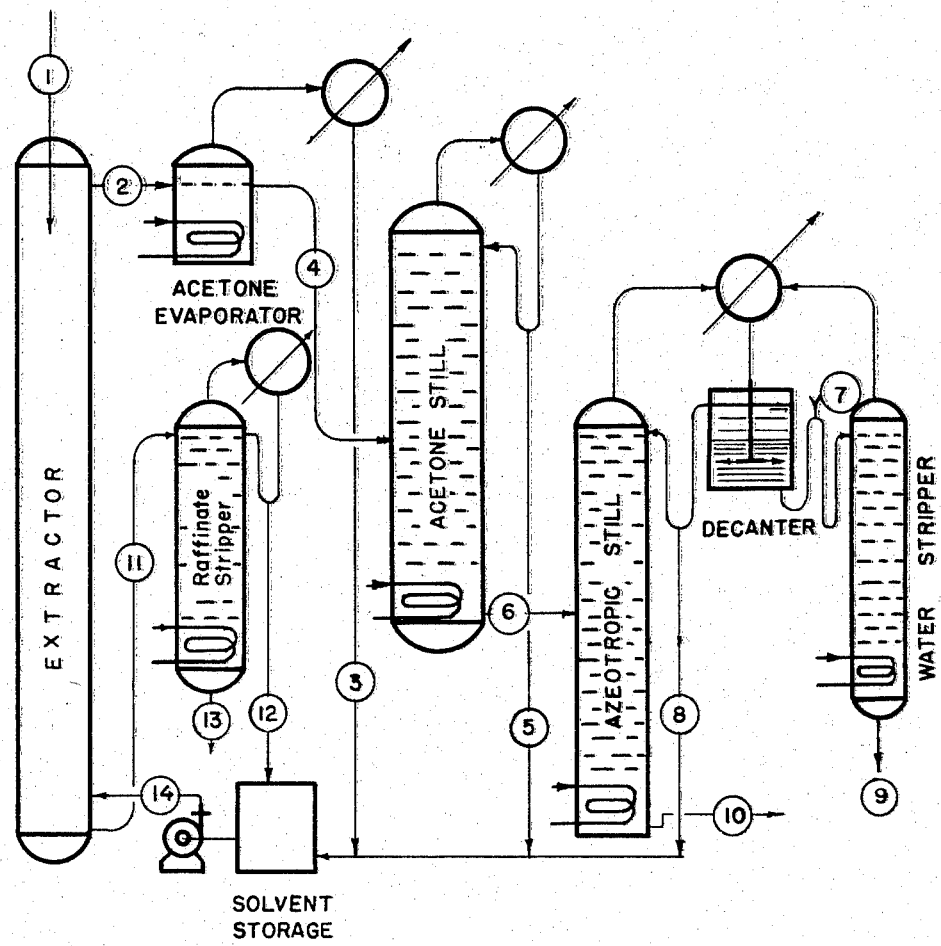

PROCESS FOR RECOVERING ACETIC ACID

Donald F. Othmer, Coudersport, Pa.

Application January 23, 1957, Serial No. 635,863

10 Claims. (Cl. 260—541)

This invention relates to a method of recovering in a concentrated form lower molecular weight volatile fatty acids, especially acetic acid, from liquors resulting from the treatment of lignocellulosic materials such as wood, bagasse, straw and other vegatative materials as well as from certain other liquors containing large amounts of salts or other organic or inorganic solids dissolved therein. The fatty acids, after first being liberated by a strong acid, if in the form of salts, are extracted from the liquors by acetone, to which is sometimes added a less soluble solvent.

Hereinafter, while often the term "acetic acid" is used, this acid often has with it relatively minor amounts of other volatile homologous acids up to a maximum of about 10 to 15 percent of formic acid—based on total acid present, lesser amounts of butyric acid, and usually much smaller amounts of propionic acid, and others which may occur simultaneously in these liquors resulting from wood treating operations or other chemical processing. Hence, the acid referred to in this processing step may actually be a mixture of one or more of these homologues with acetic acid. Correspondingly the term "acetate" may be regarded to include the salts of these related acids which are present in minor amounts in other stages of the processing.

In the prior art, there have been disclosed many methods of extracting and concentrating acetic acid and other simultaneously occurring aliphatic acids occurring in the free form in solutions obtained from treating lignocellulose materials and other processes.

In many operations of the cellulose industries, acetic acid and its mixtures with other aliphatic acids, for example, propionic acid, butyric acid, and particularly formic acid, occur in the form of salts with the potassium, sodium, ammonium, magnesium, calcium or other alkaline earth cation, which cation has been used in the cooking or other treatment of wood or other cellulosic materials. In order to liberate the organic acids from the salts, sulfuric acid or other strong mineral acid may be added, and this gives also the corresponding salt of the strong acid in solution.

Whereas such solids in the solutions of the lower aliphatic acids may often be salts, there may be other solids present which may have relatively high molecular weights and are often of organic constituency. These solids may be in addition to salts formed by addition of strong acids to free the volatile fatty acids or other salts present, or they may be the only solids present in aqueous solutions of these acids coming from other processing. The term "solids" is herein used to include all those inorganic or organic salts of an organic or inorganic nature plus any other solid or non-volatile liquid constituents, either organic or inorganic, which solid or non-volatile liquids are present in the state of colloidal or true solution and which thereby change the miscibility of organic solvents with the aqueous solutions.

It has been found that the amounts of accompanying salts and other solids which are present in the aqueous solution of the lower fatty acids may be sufficient to increase the extraction ability of an organic solvent for dissolving out the acetic and related acids. This is measured by the partition coefficient which is the ratio of the amount of acid in unit volume of the solvent or extract layer to the amount in the aqueous layer. Correspondingly, and sometimes of greater importance, the dissolved solids have been found to increase the mutual immiscibility of the water therein with the organic solvents for the acids, and particularly with acetone, which may be mixed with such solutions. This is called the "selectivity" and may be shown by the relative concentrations of acetic acid in the two layers, i. e., the ratio of acid plus water in the solvent layer to that of the acid plus water in the water layer.

Also present in some of these present liquors being considered are other high boiling liquids such as furfural and possibly semi-solid materials such as organic waxes or wax-like bodies. These materials may be separately removed at some stage of this inventive process, to be described hereinafter.

The liquors to be processed may be those which result from: (1) the destructive distillation of wood, the acids in which have then been neutralized, with an alkaline base; (2) the pulping of wood to give cellulose by various alkaline, acid, or neutral chemical reagents either inorganic or organic (the cellulose being more or less contaminated by unremoved lignin and other constituents depending on the efficiency of the pulping process); or (3) the decomposition of wood by alkaline fusion (e. g. for the production of oxalates, etc.). Still other processing of vegatative matter or of organic synthesis may give relatively concentrated aqueous solutions of sugars or other solids together with lower aliphatic acids as such or in the form of salts. In most cases, the liquors resulting from such processing contain various residual solid products as undesired products of such treatment in true or colloidal solution. In the destructive distillation of wood, for example, the earlier process was to neutralize the acetic acid with an alkaline material, such as lime, prior to the recovery of the wood alcohol therefrom. Besides the calcium actate, residual tars and other high molecular weight materials which tend to condense or polymerize are present in the liquors.

In the caustic soda treatment or fusion of wood, such as sawdust, with the consequent formation of sodium oxalate, the caustic soda also forms sodium acetate and sodium formate during the decomposition of the wood; and there are present various other products of the reaction, often called humus materials.

In the treatment of lignocellulosic materials with various chemical liquors for producing wood pulps; for example, in among others, the neutral sulfite semi-chemical process, the kraft or sulfate process, etc. there are produced, along with other products, the salts of the lower aliphatic acids, principally the salts of acetic acid and of formic acid corresponding to the cation used in the basic cooking liquors. These salts appear in the residual black liquor resulting from the respective processes and have been shown by Hagglund and others to be equivalent to an amount of about 5% or more total acetic acid and formic acid based on the dry weight of the wood used.

In many cases, for one reason or another, the above liquors are evaporated to concentrate the salts. On treatment with sulfuric acid or other strong mineral acid of the above-mentioned liquors and other liquors containing inorganic acetates, etc., either with or without concentration, the acetic acid and related acids are liberated in the solution along with the production of the corresponding inorganic salts of the mineral acid.

In various other liquors resulting from processing of vegetative materials, or in organic syntheses, acetic acid and its lower boiling homologues may be found dissolved in aqueous solutions containing considerable dissolved solids.

The amount of acetic acid to be recovered and which may be recovered by the present process may be from about 1% to about 30% based on the acetic acid plus water present. While solutions of lesser strengths may be handled, this would not usually be economic; and while solutions of greater strengths may be handled, by modifications of the process, such strengths of acid are not usually met in industrial liquors to be recovered.

In all of the industries where the above liquors are present, it may be desired to recover the acetic acid and other acids for one or more of the following reasons:

(a) so as to use or sell them in other chemical industry;

(b) so as to obtain other products of value in the residual liquors in a more or less pure form;

(c) so as to allow the liquors to be disposed of as waste to streams.

Either in the free form or in the salt form, these aliphatic acids are a disagreeable constituent of waste liquors which are to be disposed of by dumping into streams, lakes, etc. as they have a high biological oxygen demand (BOD), i. e. high absorption of dissolved oxygen with consequent damage to aquatic life requiring it.

In the prior art there have been described many processes of separating the acetic acid from liquors containing acetic acid as such by the extraction of the liquors with solvents of greater or less immiscibility with water and having other different properties and particularly, different boiling points. In the usual case these processes have been primarily intended for use with liquors which have no, or relatively small amounts of, dissolved solids. These prior processes are performed with: (a) "low boiling solvents," i. e. those boiling below about 100° C. which may readily be distilled away from acetic acid, (b) "high boiling solvents," i. e. those boiling above 140°–150° C. from which the acetic acid may readily be distilled; and (c) "intermediate boiling solvents," i. e. those boiling about 100° C. to 140–150° C. which require somewhat different distillation techniques for separation of the acetic acid—usually some form of azeotropic distillation.

Still other processes have been designed and used for the solvent extraction of acetic and related acids from black liquors resulting from semi-chemical pulping operations wherein the waste liquor contains relatively large concentrations of solids dissolved in an aqueous solution of acetic acid. Two such processes may be mentioned, namely that described in United States Patents Nos. 2,744,927 to Copenhaver, Biggs & Baxley as well as that of 2,714,118 to Copenhaver, Biggs, Baxley & Wise.

It is to this latter group of processes which this invention may be compared. Neither 2,714,118 nor 2,744,927 describe a process, however, for obtaining an anhydrous acid; and in both cases the extract solvent layer from the extractor containing the acid is distilled to recover the solvent leaving a concentrated acid behind, which still contains a considerable amount of water and which therefore must be treated by other processing steps. Particularly in 2,714,118, where methyl ethyl ketone is used as an extracting solvent, the methyl ethyl ketone carries over a considerable amount of water with it during the distillation of it from the acid; but this water does not separate out as a separate layer on cooling the condensate. Thus, the mixture of methyl ethyl ketone and water (a binary azeotrope) must be recycled back for reuse as the extracting solvent. This results in a large heat requirement because of the high latent heat of water, and amounts to using a solvent containing 10 to 15% water.

In the use of other low-boiling solvents in acetic acid recovery from aqueous solutions, it has invariably been the practice for the last 70 years to distill the solvent away from the acid and the water as, for example, in the use of ether, ethyl acetate, etc. as solvents for the acetic acid. Methyl ethyl ketone, the solvent of U. S. Patent No. 2,714,118, does not distill away from the water; it carries over much of this water into the distillate, from which it cannot be separated; and this solvent and water recycles to the extractor. This adds greatly to the overall heat cost of the separation and to the size and cost of the plant equipment required.

In the accompanying figure of this invention, there is indicated diagrammatically a flow sheet representing standard units of equipment to be used in combination for the invented process described, which has now been found to overcome the disadvantages of the prior art. Each unitary piece of equipment may be varied among those standard types available, and the arrangement of the combination may also be varied to suit best the particular needs. All of the equipment units will not necessarily be used in each embodiment of the process; and that which will be used is indicated in the examples. (For ease in reference, the name of the units are capitalized.)

The Extractor is any one of several known devices useful for counter currently treating the aqueous liquid containing solids and aliphatic acids which is fed into it near the top and which descends against a rising stream of solvent which is fed into it near the bottom of the solvent storage. The Raffinate Stripper is a short, steam heated, distilling column adapted to handle the solids of the raffinate, in whatever form they may be; and wherein the solvent dissolved in the aqueous solution during extraction is flashed off, condensed and passed back to the Solvent Storage. The Acetone Evaporator is a steam heated boiler for evaporating, without rectification, a part of the low boiling solvent, which is condensed in its accessory condenser and returned immediately to the solvent storage for reuse. The steam heated Acetone Still rectifies the balance of the low boiling solvent from the extract layer, passes acetone as vapors to its accessory condenser. Part of the acetone condensate recycles as reflux liquid and the remainder is returned to the Solvent Storage tank. The steam heated Azeotropic Still dehydrates the bottoms product of the Acetone Extract Still by distilling the water therein overhead in an azeotropic mixture of water vapor with entrainer vapor; the vapors are condensed to form two liquid phases; the two-layer condensate is passed to a Decanter where the entrainer layer is removed and then returned to the top of the Azeotropic Column still. The water layer from the Decanter is passed to the steam heated Water Stripping column wherein the small amount of entrainer dissolved therein is distilled out along with some water. The vapors from the water Stripping Column may be passed to the same Condenser and Decanter used for the Azeotropic Still as shown in the drawing or to others. The water is removed from the bottom of the Water Stripping Column to waste. The substantially dry crude acetic acid is conveyed away from the base of the Azeotropic Column for subsequent separation from minor amounts of homologous acids and other impurities to give a pure glacial grade of acid.

For reference in the accompanying examples, some of the connecting pipe lines are numbered as indicated. All of these are fitted with the essential valves necessary for the control of liquid flow, although these valves are not shown.

One purpose of the present process is to use acetone as a low-boiling solvent for acetic acid in aqueous solutions containing large amounts of salts and other organic and inorganic materials. Because of its miscibility with water, acetone has not previously been used. It is the only ketone completely miscible with water, and the only ketone which does not have a constant boiling mixture with water. It is also much cheaper than any other ketone.

The aqueous solutions to be processed may contain free acetic acid and solids resulting from organic processing, or they may be solutions which may have contained an acetate salt, in more or less dilution, and which have been acidified with a strong acid to free the acetic acid, either directly or after evaporation of much of the water to produce a higher concentration.

Acetone does not separate as an extract or solvent layer when added to solutions of water and acetic acid. If there is a sufficient amount of solids dissolved in the solution, acetone has been found to form a second contacting layer with many such concentrated aqueous acetic acid solutions of industrial importance (usually containing at least 50% solids by weight, sometimes only 40% or slightly less). This second layer contains a much higher concentration of acetic acid than does the aqueous layer—particularly when considered on the solids-free basis. Acetone, when in contact with such concentrated aqueous solutions, has thus been found to have a high extraction or partition coefficient for the acetic acid. In some cases this partition coefficient has been found in the practice of this invention to be as high as 4 or 5; i. e. four or five times as much acetic acid in unit volume of solvent compared to unit volume of water. The use of such a solvent makes possible a tremendous improvement in process compared to the widely used solvents of the prior art which have partition coefficients of only one-tenth to one-fifth as much; and therefore require from five to ten times as much solvent to be used and distilled, with correspondingly higher heat costs and larger equipment for separation.

Acetone also has the desirable property that it will not emulsify readily during extraction with most concentrated aqueous solutions of solids in commercial type extractors; and with some aqueous solutions worked with in this invention it has been found to be better in this respect than any other solvent known.

Furthermore, acetone which remains dissolved in the solution after extraction may readily be distilled therefrom because of its high volatility from aqueous solutions. For the same reason, it may be evaporated or distilled readily from the extract layer; and, in fact, a substantial portion of that used as a solvent may be distilled or evaporated out of the extract layer in a simple pot still or evaporator without any reflux and without appreciable acetic acid distilling over. Thus, for example, one extract layer containing the acetic acid removed from a solids containing solution, had a liquid composition of 70% acetone, 15% water, and 15% acetic. It was found that the first distillate from this contained less than 0.1% acetic acid.

It has been found that acetone may be used as a solvent for acetic acid from aqueous solutions containing sufficient solids dissolved therein so that a second, or extract layer, is formed by the following sequence of operational steps, which are indicated in reference to the figure.

(1) Extract the original liquid entering the system in pipe 1 with acetone fed through line 14 to a standard multistage and continuous countercurrent Extractor.

(2) Withdraw by pipe 11 the raffinate or substantially acetic-acid-free aqueous layer to the Raffinate Stripper supplied with reflux; strip it of dissloved solvent and recycle the stripped acetone therefrom by pipe 12 to the Extractor by way of the Solvent Storage tank. The deacidified raffinate may then go by pipe 13 to other processing units for removal of other valuable components therein, such as sodium sulfate as well as other materials.

(3) Pass by pipe 2 the extract layer to the Acetone Evaporator where vapors are boiled off until an appreciable quantity of acetic acid starts to come over in these vapors. These are condensed; and the acetone is returned by pipe 3 to the Solvent Storage. This step may be combined with step 4, in which case all of the acetone is removed in the Acetone Extract Still, with pipe 2 communicating directly with pipe 4.

(4) Feed the extract liquid directly from the Extractor, or that remaining after removal of part of the acetone in the Acetone Evaporator, by way of pipe 4 to the Acetone Still, having a supply of reflux liquid to remove the last trace of acetone as substantially acid-free and water-free vapors overhead, condense and recycle through pipe 5 to the Solvent Storage. The concentrated crude acid, stripped of acetone, is removed through pipe 6.

(5) Distill the concentrated crude acid by known means (such as shown in U. S. Patent No. 2,050,234) to obtain successively pure water and then pure acetic acid, as overhead distillate products, free of each other and from any solid, semi-solid, or high boiling liquid impurities.

Thus the use of acetone alone as a single solvent for removing the acetic acid from those aqueous solutions containing sufficient quantity of non-volatile material dissolved therein to allow a formation of an acetone layer, provides a solvent of very high extractability so that only a minimum amount of solvent may be used and distilled—hence, heat costs are low; and the amount of expensive, acid-resisting equipment is small. Furthermore, it is sometimes possible to distill off much of the acetone without reflux in a simple still or evaporator; and this prevents the use of much additional heat otherwise used for reflux; and it also further reduces the cost of the distillation plant.

*Example 1*

In a commercial organic synthesis process there is obtained a spent solution containing 60% sucrose or cane sugar, 35% water, and 5% acetic acid. When acetone is mixed with this solution, an extract layer is formed with a partition coefficient (extractability) of approximately 4.

The acetic acid was removed by the following steps:

(1) 1000 pounds of sugar solution were continuously extracted counter currently with one half as much acetone in an Extractor as shown in the figure. Substantially all of the acetic acid was thus removed from the spent sugar solution.

(2) Next the spent sugar solution was flashed in a relatively inefficient distillation column, the Raffinate Stripper shown in the figure, to recover the acetone dissolved therein.

(3) The extract layer was then fed to the Acetone Evaporator; and 50 pounds were evaporated and condensed to give acetone with little or no acetic acid; this distillate was directly returned to extract more acetic acid.

(4) The residue liquid from the Acetone Evaporator was fed to the Acetone Still of 30 equivalent plates, fitted for reflux; the balance of the acetone was distilled from the top practically free of acid and water and returned to the Solvent Storage tank.

(5) The bottoms product from the Acetone Still consisting of approximately 50 pounds of acetic acid and some water dissolved in the extraction step was dehydrated in the Azeotropic Still using butyl acetate as the entrainer according to the method of U. S. Pat. 2,050,234.

*Example 2*

To a solution containing calcium chloride and calcium acetate from industrial chemical processing, there was added muriatic acid in an amount sufficient to free the acetic acid and to give an additional amount of calcium chloride. The acidified solution then contained approximately 40 grams of calcium chloride and 5 grams of acetic acid per 100 grams of solution.

When acetone was mixed with this solution two layers formed and it was found that the distribution ratio between the two layers was somewhat over 2 in favor of the acetone.

The procedure of extraction and distillation of the acetone layer was carried out as in Example 1 except that all of the acetone was removed directly in the Acetone Still.

The acetic acid obtained from the Acetone Still contained some water which was removed in an azeotropic distillation with butyl acetate to give glacial acetic acid.

With aqueous solutions of acetic acid of lower solids content, usually less than about 50%, acetone has a poor selectivity (i. e. extracts more water). As the solids concentration in the aqueous solution is reduced, the acetone solvent layer disappears; and the acetone becomes completely miscible usually when the concentration of solids in the aqueous solution is lower than 50%, often as low as 40%, i. e. one part solids to 1½ parts water.

In these cases it has been found advantageous to add a second liquid solvent, highly immiscible in water, to the acetone for reduction of its miscibility for water. (It has been found possible to evaporate some solutions containing acetate salts to a higher concentration before adding a strong acid to free the acetic acid. With the higher percentage of solids, the solution will then allow a separate acetone layer to form. This, however, is not always the most economic method when all costs are considered.)

As the second component of this two-solvent combination, or "co-solvent," there may be added a solvent either of low or of intermediate boiling range (as defined above) which, by itself, has much less miscibility with water than does acetone. It has been found that if properly selected, this co-solvent improves acetone's selectivity for dissolving acetic acid with a minimum of water. The amount of such co-solvent in the mixture with acetone will depend greatly on its properties and particularly on those of the solution to be extracted. It may be added in an amount from about 10% to about 90% of the solvent mixture; but a preferred amount is usually from 10% to 60% of the mixture.

A low-boiling co-solvent such as ethyl ether or isopropyl ether which is substantially immiscible with water, and thus minimizes the miscibility with water of its acetone combination may be so chosen that it will increase the relative volatility of acetone on distillation from water and from acetic acid, and thus make the separation of the solvent combination for reuse even easier than in those cases where pure acetone was used.

If it is in the intermediate boiling range such as, for example, methyl isobutyl ketone, this co-solvent may be chosen so that it is also an azeotropic withdrawing agent for water. Some water always dissolves in the solvent layer from the extraction, less when the co-solvent is used; the water remains after the acetone removal; and it may later be removed, to dehydrate the acid, by azeotropic distillation with this co-solvent if that is correctly chosen to have the desirable water entraining properties.

Such an intermediate or low boiling co-solvent should usually be so selected that it will not have a constant boiling mixture with acetic acid or with formic acid, which would interfere with distillating solvents and/or water substantially acid-free from the extract layer. Thus, while the hydrocarbons, chlorinated hydrocarbons, and some other volatile carbon compounds such as carbon bisulfide have been used in combination with acetone as a co-solvent, they are not usually the best such low boiling co-solvents since they form azeotropic mixtures with formic acid, with acetic acid, or with both.

An important discovery of the present invention is that acetic acid may thus be extracted from a solids-containing aqueous solution by acetone or acetone plus a co-solvent which imparts the desired selectivity to the solvent mixture for acetic acid as opposed to water. The solvent or extract layer after the extraction contains the solvent mixture, substantially all of the acetic acid and some water.

Preferred co-solvents of the low boiling group, i. e. boiling below about 100° C., to be added to acetone have been found to be the ethers of low molecular weight. One is ethyl ether, boiling at 34.6° C. and having a solubility in water of 6.9% and of water in ether of 1.3% (at 20° C.). Particularly good is isopropyl ether, which boils at 68.3° C. and has a solubility in water of only 0.90 part by weight per 100 parts water and of water in ether of only 0.57 part water per 100 parts ether (at 20° C.).

Also useful are other ethers which are less common commercially, boiling above 30° C. and below about 100° C. and coming from various petrochemical manufacturing processes. These ethers include methyl n-butyl (70° C.), ethyl iso-butyl (80° C.), ethyl n-butyl (91.4° C.) and others. Because of ease of separation by distillation, those boiling between 30° C. and 80° C. are particularly preferred.

Just as in the use of acetone alone, in its use with a co-solvent, all of the solvent must be removed from the solvent or extract layer. With the low-boiling co-solvents this may be done by evaporation and then distillation. Because of the low boiling point of acetone as compared to that of water and to that of acetic acid or of formic acid, a part of the acetone may be evaporated from the extract layer without rectification and without distilling acetic acid overhead. If one of the low-boiling co-solvents such as ethyl ether or isopropyl ether has been added, some or much, of this will also go over with the acetone in the evaporation step. After a substantial amount of the solvent mixture has been evaporated, and acid starts to come over in the condensate, the balance of the extract layer is fed to a column still having reflux wherein the rest of the solvent mixture is removed overhead. The bottoms product of the still contains the crude acid containing some water which is then dehydrated by conventional methods.

Isopropyl ether is another desirable low boiling co-solvent. It has, with acetone, a minimum constant boiling mixture boiling at 53.3° C. containing 56.5% acetone and 43.5% isopropyl ether. The constant boiling mixture of isopropyl ether with acetone helps in distilling acetone away from the extract layer by increasing its relative volatility with respect to acetic acid. As mentioned above, a substantial part of the solvent mixture may be evaporated off, without rectification or reflux, thus reducing heat costs, and this will include much of the azeotropic mixture.

In the use of a mixture of acetone and a low boiling solvent such as an ether with a normal boiling point from 30° C. to about 100° C. as a mixed solvent for acetic acid from aqueous solutions containing dissolved solids, the sequence of operations is exactly the same as described above using acetone alone. In the use of some of the ethers, the preferred low boiling co-solvents, there is usually a constant boiling mixture with acetone, which brings over the acetone at a lower boiling point than its normal 56° C. Depending on the relative boiling points of acetone and co-solvent and of their constant boiling mixture, if such there is, more or less of each may be removed in this step. This step, however, may be combined with the reflux distillation in the Acetone Still Column if desired to eliminate the separate process step.

The crude concentrated acetic acid solution is discharged from the Acetone Still and is then dehydrated and refined by commonly known methods.

Thus the use of a low boiling co-solvent mixed with acetone allows the advantages of acetone as a solvent for acetic acid, e. g. high extractability and low tendency for emulsion formation, to be utilized with those solutions where the amount of dissolved solids or non-volatile liquid is not sufficient to cause a solvent layer to be formed with acetone alone. Furthermore, in the subsequent distillation, there is often a greater ease of separation of the acetone from the extract layer.

Example 3

Black liquor of about 1 part total solids by weight to 9 parts water from the neutral sulfite semi-chemical process of wood pulping was concentrated to one part total solids to one part water, and treated with sufficient sulfuric acid to liberate acetic acid and formic acid from the respective salts.

In a continuous counter-current extraction with an efficiency of about 8 theoretical stages, 1000 grams of the concentrated and acidified liquor was extracted with an equivalent of 1300 grams of a 50% acetone–50% ethyl ether mixture to remove practically all of the acetic acid from the liquor. The extract layer was evaporated; and approximately 400 grams of a mixture of acetone and ethyl ether was vaporized and condensed for reuse before acetic acid was noted therein. The residue from the evaporator was fed to the Acetone Column still supplied with reflux, and the solvent mixture was fractionated away from the concentrated acetic acid solution as residue.

By well known means, this acid residue was dehydrated, the formic acid was separated from the acetic acid, and both were obtained as pure products to give 85 grams of acetic acid and 15 grams of formic acid.

Example 4

The same operation was conducted as in Example 3 using 1200 grams of a 50% acetone–50% isopropyl ether solution for extracting 1000 grams of the concentrated and acidified black liquor. None of the mixed solvent was removed in the evaporator and all of it was removed under reflux in the Acetone Column still. The residue of this was also dehydrated and separated into the component acids which were refined, as before.

Co-solvents of the intermediary boiling group to be added to acetone have been found and preferred ones are the ethers and especially the ketones boiling between about 100° C. and 140° to 150° C. and including among others, ethyl tertiary amyl ether (102° C.), methyl propyl ketone (102° C.), di-ethyl ketone (102° C.), methyl iso-butyl ketone (115° C.), methyl iso-amyl ketone (145.5° C.), methyl n-amyl ketone (150° C.), ethyl-butyl ketone (145° C.). These are all relatively good solvents for acetic acid from aqueous solutions. Although the addition of one of these as a co-solvent to acetone may reduce somewhat the partition coefficient of acetone alone, each will greatly increase the selectivity of a co-solvent mixture and make possible the extraction of liquors containing somewhat less solids in solution than can be extracted by acetone alone.

In the use of an intermediate boiling co-solvent along with the acetone, such as methyl isobutyl ketone (MIBK), the first few steps of the same series of steps as with the use of the low boiling co-solvent is followed in the equipment diagrammed in the figure. An outline of the process used is as follows:

(1) The solids containing aqueous solution of acetic acid is extracted free of acetic acid in the Extractor by countercurrent action with the co-solvent.

(2) The solvent dissolved in the raffinate is removed in the Raffinate Stripper.

(3) The extract layer may be boiled in the Acetone Evaporator so that some of the acetone is removed free of acid. The co-solvent has been found to assist in this process because it reduces the volatility of the acetic acid. (This step may be combined with (4); and the pipe 4 in the figure is then an extension of pipe 2.)

(4) The balance of the acetone is removed by distillation and rectification in the Acetone Still which discharges a mixture of the acetic acid, water, and co-solvent of intermediate boiling point from the base, together with any solids or semi-solvents present in the extract layer.

(5) The bottoms discharge of the Acetone Still is fed through pipe 6 to the Azeotropic Still wherein the water is removed by an azeotropic distillation together with the intermediate boiling solvent in a vaporous mixture from the top of the still.

(6) The azeotropic mixture of vapors from the Azeotropic Still is passed to a condenser and condensed to give two liquid layers which separate in a Decanter.

(7) The layer of intermediate boiling co-solvent is decanted and run back as a reflux to the top of the azeotropic Column, and a part is withdrawn in pipe 8 to be returned to the solvent storage.

(8) The water layer from the decanter is stripped of solvent in a small exhausting column, the Water Stripper, and run out of the system through pipe 9 containing no solvent and practically no acid.

(9) The crude acetic acid is removed entirely free of water (less than 0.5%) from the base of the Azeotropic Still from step (5) in pipe 10 and is separated and refined by commonly known distilling operations.

Thus the addition of the intermediate boiling solvent to the acetone in an amount of preferably 10 to 60%, or in some cases 10 to 90%, of the total mixture provides: (a) a good extracting solvent of greater selectivity for acetic acid and greater immiscibility with water so that solutions of lower concentrations of solids may be extracted, (b) the means of separating some of the solvent, i. e. acetone, from the extract layer by flashing or distillation therefrom with no reflux or very little reflux, and (c) the means of separating water dissolved in the extract layer from the acetic acid also dissolved therein by an azeotropic distillation to give an anhydrous acetic acid and acid-free water.

While these low boiling or intermediate boiling co-solvents may sometimes be used by themselves, i. e. without the acetone, such operation is disadvantageous with the liquors with which this invention is concerned in that the solvents alone often cause emulsification, thereby making the extraction operation very difficult or even impossible. Used by themselves they also have a low extractability or partition coefficient for acetic acid. Futhermore, the separation of the intermediate solvent, if used, for the total solvent requirement, from the acetic acid of the extract layer may be somewhat difficult because the amount of this intermediate boiling solvent when used alone to extract the acetic acid may be greater than the amount of solvent required to distill out azeotropically the amount of water also present in the extract layer. Thus, there may result a dry mixture of intermediate solvent and acetic acid. Because of the nearness of the boiling points of these liquids to that of acetic acid, the separation of the liquid from dry acetic acid may be very difficult. When, however, a large amount of acetone is used as has now been found to be desirable in this process, and the intermediate boiling liquid is used only as a co-solvent for a part of the total solvent requirement, the acetone is readily removed by distillation. The amount of intermediate boiling co-solvent needed in the extraction, and remaining after the acetone is distilled off from the extract, is controlled so that it will never be greater than that required in the azeotropic distillation to remove the water also dissolved in the extract layer. Thus the separation of all solvent and water from the extract layer from the extractor is made simply and at low steam cost with comparatively inefficient distilling columns.

Example 5

In the manufacture of neutral sulfite semi-chemical pulp, there is produced a black liquor having one part total solids to about 10 parts of water. One third of the solids is sodium acetate and sodium formate taken together. This material was evaporated so that there was one part solids to one part water. Sulfuric acid was added to the black liquor concentrate; and this freed the approximately 110 grams of acetic and formic acids in 1000 grams of this liquor.

When treated with a mixture of 50% acetone and 50% MIBK two layers formed; and the distribution of total acids between the solvent and the water was found to be approximately 2 to 1, an excellent value for an industrial extraction.

The acidified liquid was extracted with an equal amount of solvent using an extractor equivalent to about six theoretical stages.

Substantially no acetic acid was left in the raffinate layer. The extract layer was immediately distilled under reflux to remove the acetone at its normal boiling point. The residue of the extract layer was azeotropically distilled utilizing the MIBK to form the constant boiling mixture with water and thus remove the dissolved water. The crude final acid contained a dry mixture of formic and acetic acids, some solids and semi-solids from the original liquors. This was subsequently refined by commonly known distillation steps.

As has already been stated, acetone has been found to have important properties in any solvent mixture: (a) It has been found to have an excellent extracting ability for the acetic acid, better than for any other solvent; and (b) it allows the extraction to proceed with a minimum of emulsification of the two layers, also usually better than for any other solvent. On the other hand it has the disadvantage of high miscibility with water (poor selectivity) and thus dissolves water from the aqueous solution, which water must later be distilled by an azeotropic distillation.

It has been found that the addition of methyl isobutyl ketone (MIBK) as an example of an intermediate solvent with entraining characteristics for water improves the selectivity of the acetone mixture therewith, i. e. reduces the amount of water dissolved and also allows the subsequent separation in the azeotropic distillation of the water which is dissolved in the extract layer. MIBK has a boiling point of 115.1° C., a latent heat of 155 calories per gram, and a specific heat of 0.496, with a density of 0.804.

However, an adequate amount of acetone must be present in the co-solvent mixture to accomplish its twofold purposes; and the amount of MIBK used may be diminished as long as sufficient is used to reduce to the desired extent the miscibility of acetone and water. Since the MIBK may be recycled any number of times in the azeotropic still for water removal from the extract layer after the acetone removal, no fixed amount need be added for this purpose; and the amount does not have to be in balance with the ratio of MIBK to water in its azeotrope. This boils at 87.9° C. and has approximately 75% of methyl isobutyl ketone and 25% of water therein. The condensate of this azeotropic distillation divides into two layers since MIBK can dissolve only to the extent of approximately 2% solubility in water and only 1% of water can be dissolved in it.

The miscibility requirement and the amount of MIBK necessary to reduce to a sufficiently low value the amount of water dissolved in the extract layer is dependent also to a large extent on the concentration of salts and their physical properties in the original material to be extracted, as well as upon the emulsion forming characteristics of these liquors. It is usually desirable to decrease to a minimum the amount of MIBK added, because the acetone in the mixture is more readily separated from the extract layer by distillation than is MIBK, and because acetone has a better partition coefficient than does MIBK.

When using a low boiling co-solvent such as isopropyl ether, there is also a preferred composition range of acetone and isopropyl ether, for example, this preferred composition will permit the use of a larger amount of acetone with higher concentrations of solids in the original liquor. This is desirable since acetone has been found to have a higher extractability for acetic acid than does any other solvent.

The amount of acetone to be used in this mixture with a co-solvent will also be greater as the tendency of the particular solutions to form emulsions increases. Emulsion tendencies are usually difficult with liquors resulting from wood processing.) This preferred composition range will be the one which would result in a minimum extraction of water into the extract layer, the optimum extraction coefficient (i. e. the minimum amount of solvent used) and the minimum emulsification characteristics.

In general and for both low boiling co-solvent and high boiling co-solvent, the advantages have been found to be secured when these relative insoluble liquids are present in amounts of not more than that required to give the degree of immiscibility for the solvent combination with acetone which is necessary for the solution being processed. In usual cases this is reached when the solvent mixture contains not more co-solvent than one and one-half times the amount of acetone present.

The difference in use of the low-boiling co-solvents and the intermediate boiling ones is the difference between: (a) the distilling of the co-solvent along with the acetone over the top of the Acetone Still, as with low boiling co-solvents; and (b) the retaining of the co-solvent with the water and acetic acid discharged from the bottom of the Acetone Still, and then the using of the co-solvent for the purpose of azeotropic dehydration of the extract layer.

It has been found that the use of the higher boiling species of the lower boiling co-solvents, from a boiling range of about 80° C. to 100° C. may also in some cases allow operation as under (b) just mentioned, since their azeotropic mixtures with water become more important and carry more water with increasing boiling temperature. Their use in this form of the process, however, would not usually be as economic as the use of the intermediate boiling co-solvents which will bring over even greater amounts of water in the azeotropic mixture and hence will have a lower heat cost for distilling out the water. Thus the best boiling range for the low boiling solvent is not over 80° C. although higher boiling liquids up to 100° C. may be used.

Because of the small amount of water which will be dissolved in the extract layer and particularly the very little amount (if any) which will be distilled with the solvent away from the extract layer, and will remain in the solvent for reuse in the extraction, there will be a lower heat requirement usually for this process using acetone alone or with a low boiling co-solvent than when using as a solvent, methyl ethyl ketone, one of the preferred materials of the prior art.

Considering again a mixture of acetone and isopropyl ether there may be a slightly higher solvent loss due to the lower boiling point of these solvents as compared to methyl ethyl ketone, but the cost of the solvent which is lost is much less because of the much lower costs of isopropyl ether and of acetone as compared to that of methyl ethyl ketone.

Other water immiscible solvents boiling between 30° C. and 100° C. may be added to acetone to secure the desired immiscibility. Esters are undesirable because of hydrolysis or ester interchange; and hydrocarbons and halogenated hydrocarbons are poor solvents for acetic acid and may cause some trouble in separation from the constant boiling mixtures which most of them have with formic acid, or acetic acid or both. However, under some modifications of the process they also may be used, with much less advantage.

The use of such mixtures of solvents as contemplated, using acetone with other constituents has very great advantage over using the alcohols and esters of the prior art (2,744,927); the alcohols esterify with the acids being recovered and the esters tend to hydrolyze or ester-interchange, since many liquors to be processed contain two or more of the organic acids. Thus, in practice when using esters, it is impossible to maintain definitely the particular ester most desirable for the operation, or to maintain a fixed ratio of alcohol to ester. Furthermore, large losses of alcohol have been found to occur in some parts of other similar processes using esters, where hydrolysis was most apt to occur.

It has now been found possible to accomplish the economical separation or recovery, and the concentration of acetic acid in a relatively simple process and in smaller equipment than by processes of the prior art: (a) from liquors resulting from wood distillation after their neutralization with lime, soda ash, or other alkaline material; (b) from liquors resulting from the chemical pulping of wood which may contain over one hundred pounds of acetic and formic acid as salts for each ton of cellulose or pulp produced; (c) from liquors resulting from a caustic fusion of woody material to give, among other things, alkaline oxalates, acetates, and formates; (d) from other alkaline liquors coming directly or indirectly from the treatment of cellulosic materials; (e) from other industrial liquors containing sufficient salts of other acids dissolved therein or other organic or inorganic solids to reduce the mutual miscibility in the liquors of water with acetone, which latter is completely miscible with pure water.

Many liquids which come from the treatment of cellulosic materials may have the acetic acid in a free form as, for example, those from the destructive distillation of wood, the hydrolysis liquors coming from the Masonite process, or from furfural or similar manufacture by acid treatment of cellulosic materials, as well as from certain other processes in petrochemical manufacture or other places where a very low acid strength is obtained. In these cases it may be desirable to neutralize the liquors as has long been the practice with pyroligneous acid with a basic material such as lime or soda ash. The concentration of the acetate-containing liquors by evaporation by any one of the known processes may then be accomplished. The acetic acid may then be liberated by adding an amount of sulfuric or other acid which will just neutralize any excess of alkali and free the organic acid.

The control of the amount of sulfuric or other inorganic acid added may be made by a control of the pH of the resulting solution to the low value predetermined for the particular liquors. Alternately, a preliminary analysis of the liquor may be made to determine the amount of volatile acids present, and the correct amount of sulfuric acid may then be added to free these acids completely. In some cases there may be a slight excess of sulfuric acid over the stoichiometric amount needed; but any excess sulfuric acid used will pass through the extractor, substantially unextracted by the organic solvent.

While sulfuric acid is usually specified and preferred, other volatile or non-volatile acids either organic or inorganic may be substituted which are more highly ionized or of higher acid strength than acetic acid. Some of these are phosphoric acid, muriatic acid, etc. Similarly, whereas sodium is usually referred to as the cation or base, as is most common, this is only exemplary; and thus sodium sulfate is also made exemplary of the reaction product of the typical acid with this typical, and more usual, base. Also, in this specification and the claims where wood is mentioned, this may mean other lignocellulosic fibrous material in the original state or after chemical or other processing.

The prior concentration accomplished in the evaporation wherein the acetic acid is in the form of a salt may be up to a range of about 1 part of total solids to ½ part of water by weight. Using acetone alone, the range may be from about 1 part of total solids to one part of water (although in some cases as low as 1 part of total solids to 1½ parts water) up to one part total solids to one-half part of water. While in some cases even higher concentrations may be used, the large amount of solids will usually present difficulties in operation of the subsequent distillation steps, if not also in the operation of the extraction step. Using the mixture of acetone and a preferred co-solvent, the range of solids may be from about one part to ten of water to one part to one half part of water. These same concentrations of solids pertain where the acids are originally in the free form.

As usually is the case, it is almost impossible to predict solubility relations in advance from the knowledge of the constituents. It has, however, been found that the combination of the salting out effect, experienced in concentrated aqueous solution of salts and other solid constituents, plus the addition of a water insoluble solvent to acetone, a water miscible solvent, will give the desired effect of allowing the extraction of the liquid.

The solids containing solution may often be concentrated up to a point where, after acidifying to free the acetic acid, the total amount of solids present is sufficient to give a solution of high enough concentration so that acetone will form an extract layer therewith. On the other hand, the solution may become too viscous or heavily laden with colloidal material, or it may crystallize out solids before it becomes immiscible with acetone. Then a water immiscible solvent must be added to the acetone to allow the formation of two layers of liquid at a lower solids to liquid ratio.

As indicated above, one of the important industries wherein this invention will be of advantage is in the production of pulp by chemical digestion of wood. The liquors from the several processes contain acetic acid and other low molecular weight homologous aliphatic acids in the form of salts. The recovery of these volatile acids also makes it easier to recover the other valuable constituents of the process liquors, such as furfural, waxes and similar organic bodies.

Of possibly greater importance is the fact that the raffinate may be treated to recover the sodium sulfate content, produced upon the addition of the sulfuric acid. This sodium sulfate has many industrial applications, such as for general use in the chemical industry, for use in Kraft pulping operations, or otherwise.

If a recovery furnace is used, as is common after concentration of black liquors from pulping operations, the sodium salts of the acetic acid and the formic acid give soda ash when burned. Thus, working with liquors from the neutral sulfite process, this burning of concentrated black liquors gives too high an alkalinity in the smelt for it to be reused in other pulping operations, such as in the Kraft process.

However, by the use of the present process with neutral sulfite liquors for the conversion of the sodium acetate and sodium formate to sodium sulfate and the consequent removal and recovery of the acids, the final smelt made from the concentration and burning of the raffinate from the extractor is largely sodium sulfate which may be used in other processes, including pulping of wood by the Kraft process, for which it was otherwise unfitted because of the large amount of soda ash which it contains.

In the recovery of acetic acid by this process from liquors of the Kraft process itself, there is a large amount of free alkali to be neutralized by the added sulfuric acid before the acetic acid and formic acid are freed by the sulfuric acid. This produces a corresponding amount of sodium sulfate from the free alkali and from the acetate and formate decomposition. This may be more than can be reused in its entirety in the recycle liquor system. On the other hand, since the usual make-up of liquors from a Kraft process requires the addition of fresh sodium sulfate, as well as sulfate radical from sulfur burning, it follows that there can be used a substantial part of such sodium sulfate formed from sulfuric acid. Hence, a part of the black liquors (between 10 and 50%) of a plant may be processed to free and subsequently recover the acetic acid as described, by the addition of sulfuric acid and the formation of sodium sulfate. This new sodium sulfate from sulfuric acid is present in the raffinate of the extractor after exhaustion of acetic acid; and it is thus the make-up for the balance of the liquors (50% to 90%) which may be processed as before without recovery of the acetic acid and formic acid. The liquors from the raffinate of the recovery process for the volatile acids is added to the other liquors before going to the drier and the furnace. By this means, a substantial fraction, between 10% and 50% of the liquors, may be processed to give that amount of the total volatile acids which are otherwise lost.

Thus, on using this invention with black liquor from Kraft pulping, the adding of sulfuric acid for recovering acetic acid from a part of the liquors replaces the sulfur and sodium sulfate make-up, which would otherwise be used for the balance of the liquors. Also, if the cost of sulfuric acid on a sulfur basis were equivalent to that of sulfur and sodium sulfate make-up normally used, it would not be an added cost in producing the amount of acetic acid recovered from the fractional amount of the total liquors treated, since it would be the normal cost of make-up chemicals for pulping the wood. If greater, due to the cost of making sulfuric acid from sulfur as compared to that for making sulfur oxides, the difference would be the amount to be charged against the cost of recovery of the acetic acid.

The interrelation of the use of this invention to a combination of processing liquors from either the neutral sulfite or the sulfate process or both is thus possible with large commercial advantages. Furthermore, it is sometimes possible to crystallize out excess solids besides those of acetic and formic acids after evaporation to a high concentration and before the acidification. The liquors will thus contain correspondingly less of other constituents during recovery of acetic acid and may cause less trouble therefrom.

Wherein, in the description of this process and the solvent liquids employed there has been mentioned boiling points, these refer to those at normal or atmospheric pressure. There is no limitation in the operation of the process under higher or lower pressures, in which case the boiling points of the solvents and their mixtures with each other, with acetic acid and with water would change accordingly.

Also, while individual pure compounds are specified of definite boiling points, under some circumstances there may be used as a co-solvent a mixture of two or more liquids which have the correct properties, including a combined boiling point or range within that found effective and described herein.

It is obvious that from these examples and many others which may be cited as indicative of the scope of this invention that any standard type of distillation process or equipment may be used which is known to the art and which is suitable for working with such solutions. The use of any standard equipment and usual processing techniques are within the scope of this invention, also the standard methods of making anhydrous acid from some of the concentrated acid solutions which result from this processing.

Also, while solids are mentioned as being those non-volatile materials in solution which cause a type of "salting out" effect for the solvent acetone, and any co-solvent used therewith as well as with the volatile acid, it also follows that the invention covers also aqueous solutions of the acids in which is dissolved any water soluble liquid having little or no appreciable volatility and which causes the same effect of reducing the miscibility of water with acetone or of acetone with a co-solvent described.

I claim:

1. The process of recovering acetic acid from its aqueous solutions containing also at least one part dissolved solids for each ten parts of water comprising extracting with a solvent mixture containing acetone and from 10% to 60% of an ether having a normal boiling point between 30° C. and 100° C.

2. The process of recovering lower molecular weight fatty acids from their aqueous solutions containing also at least one part dissolved solids per ten parts of water comprising extracting with a solvent mixture containing acetone and from 10% to 60% of a co-solvent selected from the group consisting of ethers and ketones having a normal boiling point between 100° C. and 150° C.

3. The process of claim 1 wherein the ether is ethyl ether.

4. The process of claim 1 wherein the ether is diisopropyl ether.

5. The process of claim 2 wherein the co-solvent is methyl isobutyl ketone.

6. The process of recovering acetic acid from its aqueous solutions containing also at least one part dissolved solids per ten parts of water comprising extracting with a solvent mixture containing acetone and from 10% to 60% of an ether having a normal boiling point between 30° C. and 100° C. and distilling from the extract liquid so formed the acetone and the said ether.

7. The process of recovering lower molecular weight fatty acids from their aqueous solutions containing also at least one part dissolved solids per ten parts of water comprising extracting said solution with a solvent mixture containing acetone and from 10% to 60% of a co-solvent selected from the group consisting of ethers and ketones having a normal boiling point between 100° C. and 150° C., distilling initially from the extract liquid so formed the acetone, and thereafter distilling the water and said co-solvent from the residue of the initial distillation in an azeotropic mixture.

8. The process of claim 6 wherein the ether is ethyl ether.

9. The process of claim 6 wherein the ether is diisopropyl ether.

10. The process of claim 7 wherein the co-solvent is methyl isobutyl ketone.

References Cited in the file of this patent
UNITED STATES PATENTS

| | | |
|---|---|---|
| 2,714,118 | Copenhaver et al. | July 26, 1955 |
| 2,744,927 | Copenhaver et al. | May 8, 1956 |